Figure 1:
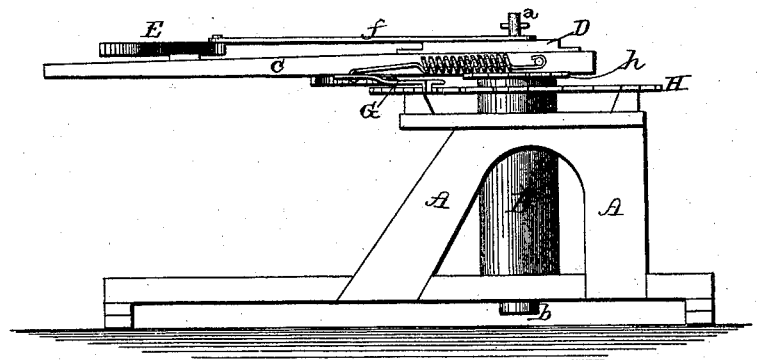
Figure 2:
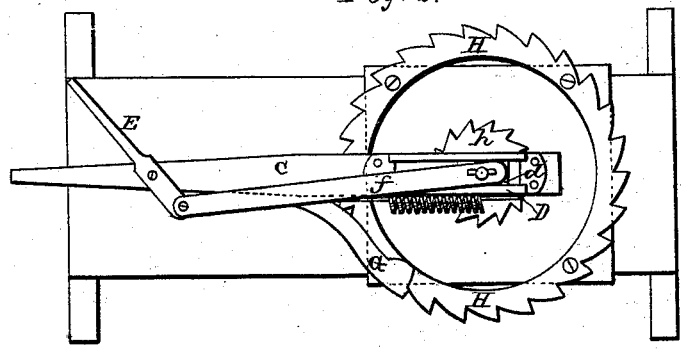
Figure 3:
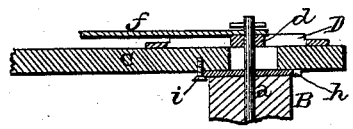

H. K. BURNETT.
COTTON AND OTHER PRESSES.

No. 171,349. Patented Dec. 21, 1875.

UNITED STATES PATENT OFFICE.

HENRY K. BURNETT, OF POUGHKEEPSIE, NEW YORK.

IMPROVEMENT IN COTTON AND OTHER PRESSES.

Specification forming part of Letters Patent No. 171,349, dated December 21, 1875; application filed November 18, 1875.

*To all whom it may concern:*

Be it known that I, HENRY K. BURNETT, of Poughkeepsie, in the county of Dutchess and State of New York, have invented certain new and useful Improvements in Presses; and I do hereby declare the following to be a full, clear, and exact description of the invention, such as will enable others skilled in the art to which it pertains to make and use it, reference being had to the accompanying drawings, which form part of this specification.

My invention relates to that class of cotton and other presses in which a capstan and rope are used; and it consists in the construction and arrangement of the capstan and sweep with the ratchet devices attached thereto, as will be hereinafter more fully set forth.

The annexed drawing, to which reference is made, fully illustrates my invention.

A represents a suitable frame, in which the cylinder B is placed so as to revolve in either direction. Through the center of the cylinder is passed a loose bolt, $a$, having a nut, $b$, screwed on its lower end, and a square or elongated head, $d$, on its upper end. Over the upper end of the bolt is placed the sweep C, which is provided on its upper side with a longitudinally slotted and flanged casting, D, between the flanges on which the head $d$ fits, allowing the sweep to be moved a short distance out or in, for a purpose that will be hereinafter described. The upper end of the bolt $a$ is, by a rod, $f$, connected with one end of a lever, E, which is pivoted on top of the sweep C, and by means of which the sweep may be moved out or in the length of the slots in the sweep and casting. On the under side of the sweep C is a dog or pin, $i$, to engage with a ratchet-wheel, $h$, secured on top of the cylinder B, when the sweep is moved inward by means of the lever E, as above described. When the sweep is moved outward the dog $i$ is disengaged from the ratchet-wheel. To the sweep C is further pivoted a dog, G, to work in a ratchet-circle, H, made stationary on the frame A, said dog being held in gear therewith by means of a spring, $m$, as shown.

When the capstan thus constructed is to be used for pressing, or, in other words, to wind up the rope, the sweep C is moved inward by means of the lever E until the dog $i$ engages with the ratchet-wheel $h$. The sweep now being put in motion, the cylinder B will be turned to wind up the rope.

When the sweep is moved outward far enough to disengage the pawl $i$ from the ratchet-wheel $h$, the cylinder will be turned in the opposite direction by the unwinding of the rope, the sweep being held under all circumstances from moving or turning backward by means of the pawl G and the ratchet-circle H.

Having thus fully described my invention, what I claim as new, and desire to secure by Letters Patent, is—

1. The combination of the cylinder B, revolving loosely around the bolt $a$, and the sweep C, having its inner end made slotted, so as to fit over the top of the bolt, and be moved back and forth, for the purpose of throwing the cylinder in and out of gear, substantially as shown.

2. The combination of the cylinder B, with ratchet-wheel $h$, the bolt $a$, with elongated head $d$, the slotted sweep C, with slotted and flanged casting D, and the dog or pin $i$, substantially as and for the purposes herein set forth.

3. The combination of the ratchet-circle H, spring $m$, and dog G, substantially as shown.

In testimony that I claim the foregoing I have hereunto set my hand and seal this 12th day of November, 1875.

HENRY K. BURNETT. [L. S.]

Witnesses:
 MICHAEL BRACKEN,
 EUGENE TOMPKINS.